Sept. 22, 1942.   R. F. B. COX   2,296,503
PREPARATION OF ABIETIC ACID
Filed March 27, 1941
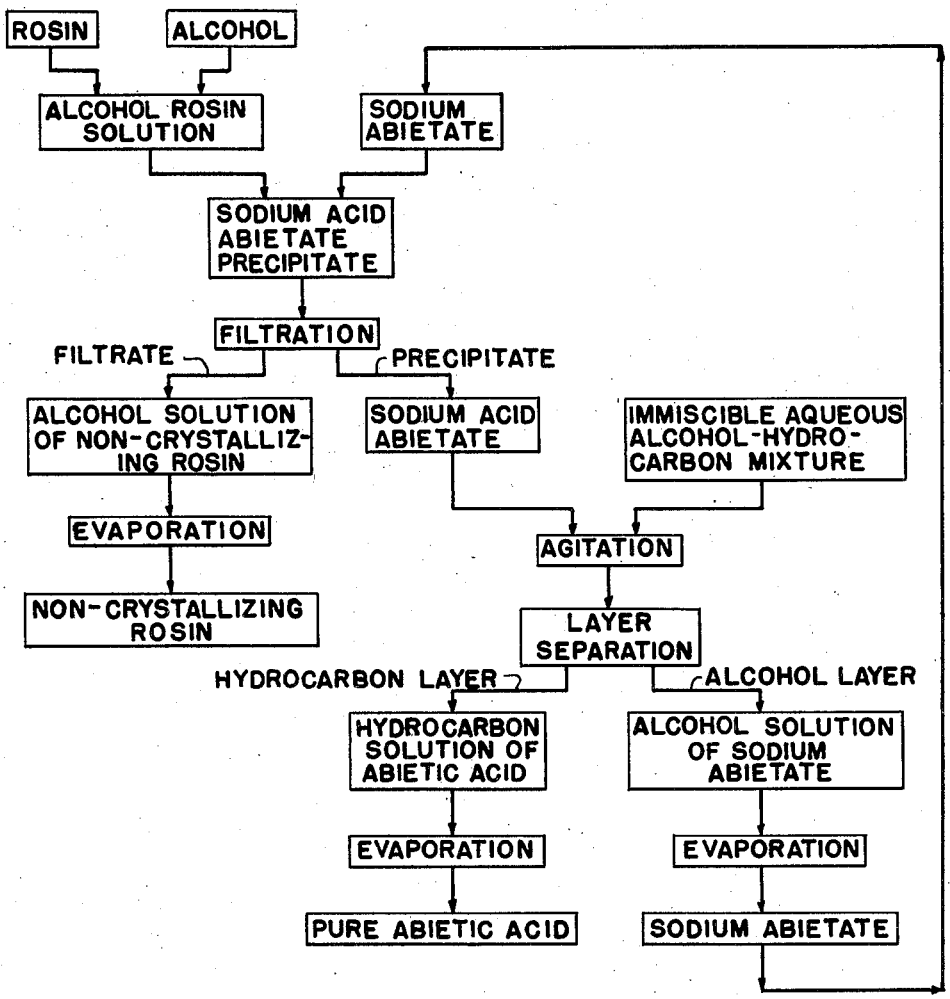
RICHARD F. B. COX
INVENTOR.
BY Cleveland B. Hollabaugh Patented Sept. 22, 1942

2,296,503

UNITED STATES PATENT OFFICE 2,296,503

PREPARATION OF ABIETIC ACID

Richard F. B. Cox, Wilmington, Del., assignor to Hercules Powder Company, Wilmington, Del., a corporation of Delaware Application March 27, 1941, Serial No. 385,415

10 Claims. (Cl. 260—105)

This invention relates to a process of removing abietic acid from rosin.

Heretofore, abietic acid has been obtained from rosin by distillation from resenes and other impurities. This method is unsatisfactory because of side reactions such as decarboxylation and disproportionation which result in reduced yield and contamination of the product. Efforts have been made to produce abietic acid from rosin by crystallization of the crystallizable acids but this produces a mixture of several acids which cannot be separated from each other. Another method has involved formation of a sodium soap solution of the rosin, extraction of the resenes therefrom, followed by acidification, but this produces a complex rosin acid mixture and involves consumption of alkali and acid.

It is also old to remove abietic acid from rosin by dissolving the rosin in alcohol, adding an alkali in amount sufficient to form the 3:1 salt (sodium tetrabietate or sodium acid abietate) which is insoluble and precipitates out, separating this precipitate, and treating it with aqueous mineral acid in the correct amount to yield pure abietic acid. See U. S. Patent 1,628,535. However, in actual application, this process involves numerous disadvantages among which are, (1) Upon addition of the mineral acid to the mass of 3:1 salt, the insoluble abietic acid formed initially forms a protective coating around the individual particles of 3:1 salt thus preventing further acidification of the 3:1 salt; (2) Neither the sodium nor the mineral acid can be re-used. For these and other reasons the recovery of abietic acid from 3:1 salt is very difficult and expensive in practice and has not been commercially adopted. Since sodium acid abietate (the 3 to 1 salt) is very insoluble in water and in available organic solvents such as ethers, alcohols, ketones, hydrocarbons, etc., the problem of recovering abietic acid therefrom is further complicated.

It is an object of the present invention to provide a method for preparing abietic acid which overcomes the disadvantages referred to above.

Another object is to provide an improved process for recovering abietic acid from rosin.

A still further object is to effect the isolation of abietic acid from rosin by way of the acid abietate without resorting to acidification.

A further object is to use neutral sodium abietate as the source of alkali in the production of sodium acid abietate.

A still further object is to produce a non-crystallizing rosin.

Other objects will more fully hereinafter appear.

I have discovered that the foregoing objects may be accomplished by combining an alkali abietate, preferably sodium abietate with rosin, preferably in solution in alcohol to form the 3:1 salt, separating the 3:1 salt precipitated and contacting the separated 3:1 salt with an immiscible mixture of a non-polar solvent for abietic acid such as gasoline and a polar solvent for sodium abietate such as alcohol. The 3:1 salt is broken up into sodium abietate and abietic acid which distribute themselves between the two layers. The layers are then separated and the abietic acid recovered from its layer by evaporation. The layer containing sodium abietate, or the sodium abietate recovered therefrom by evaporation, may be recycled and used in the initial treatment of rosin to form 3:1 salt.

The removal of abietic acid in the form of the very insoluble sodium acid abietate is a very desirable method for the isolation of abietic acid. Abietic acid is the only acid which has been reported to form such a 3:1 salt. The 3:1 salt can, therefore, be expected to produce pure abietic acid.

As used herein, the term "abietic acid" is used to denote those acids having the crystallographic data reported by Georgi (J. Chem. Ed., 10, 416 (1933)) for abietic acid and capable of entering into the sodium acid abietate crystal lattice.

Because of the ease of formation and the great insolubility of sodium acid abietate in alcohol or acetone, the usual solvent media used in its formation, abietic acid can be removed essentially completely from rosin. Moreover rosin which does not normally contain a high percentage of abietic acid can be isomerized by known methods such as warming with mineral or acetic acid to greatly increase its content of abietic acid. Then by the process of the present invention, a high yield of relatively pure abietic acid can be isolated. Prior methods of isolating abietic acid from rosin by way of sodium acid abietate have involved acidification of this 3:1 salt to free the abietic acid. This was disadvantageous because fresh sodium carbonate or hydroxide and mineral acid must be used for the preparation of each new batch of abietic acid. My process completely overcomes these difficulties.

In addition that portion of the rosin which is not convertible to sodium acid abietate is a non-crystallizing rosin useful wherever such a rosin is desirable, as in the sizing of paper. This rosin may be recovered in any suitable manner from the mother liquor from which the 3:1 salt was precipitated. The mother liquor or the rosin recovered therefrom may be purified in any suitable manner.

Sodium acid abietate (the 3:1 salt) consists of one molecule of sodium abietate loosely combined in the crystal form with three molecules of abietic acid, and is relatively insoluble in most pure solvents such as water, gasoline, alcohol, acetone, etc. Neutral sodium abietate, however, is much more soluble in neutral polar solvents such as water, acetone, ethyl acetate, alcohols such as methyl alcohol, ethyl alcohol, propyl alcohol, aldehydes such as furfural, phenol, nitriles, amines, and mixtures thereof. If, in accordance with my invention, the sodium acid abietate be shaken with an immiscible mixture of such a polar solvent and a nonpolar solvent for abietic acid, such as ether, isopropyl ether, benzene, toluene, petroleum ether, gasoline, kerosene, pine oil, turpentine, chloroform, carbon tetrachloride, carbon bisulfide, etc., the sodium acid abietate breaks down into sodium abietate which dissolves in the polar solvent and abietic acid which dissolves in the nonpolar solvent.

Examples of immiscible pairs of polar and nonpolar solvents which have been found suitable are:

| Polar solvent: | | Nonpolar solvent: |
|---|---|---|
| Water | and | Ether |
| Water | and | Isopropyl ether |
| Water | and | Benzene |
| Water | and | Pine oil |
| Water | and | Turpentine |
| Water | and | Toluene |
| Water | and | Gasoline |
| Water | and | Kerosene |
| Water | and | Chloroform |
| Water | and | Carbon tetrachloride |
| Water | and | Carbon bisulfide |
| Methyl alcohol | and | Gasoline |
| Ethyl alcohol | and | Gasoline |
| Propyl alcohol | and | Gasoline |
| Furfural | and | Gasoline |
| Phenol (preferably aqueous) | and | Gasoline |

It is preferred to use polar and non-polar solvents which are both volatile so that they can be removed by evaporation or distillation. Preferably the solvents used are immiscible or are capable of being rendered immiscible as by change of temperature. For example methyl alcohol and gasoline form immiscible layers at room temperature only when certain proportions are employed and I contemplate the use of such proportions. It is preferred to use aqueous methyl or ethyl alcohol and a hydrocarbon such as benzene, petroleum ether, gasoline, kerosene, etc. as the pair of immiscible solvents.

The sodium abietate can be recovered from the polar solvent by evaporation, recycled, and added to an alcohol or acetone solution of rosin in a repetition of the process. If alchol or acetone containing only small amounts of water be used as the polar solvent, the resulting polar solvent solution of sodium abietate can be used for the preparation of 3:1 salt directly without evaporation simply by addition of the required amount of rosin. If aqueous alcohol is used as the polar solvent, the solution of sodium abietate can be dehydrated by the known process of azeotropic distillation with benzene until the alcohol approaches about 95% alcohol concentration. This solution of sodium abietate in 95% alcohol can then be added to rosin to form crystals of sodium acid abietate.

The abietic acid solution can be treated to distill off the solvent whereupon there is recovered resin acids of the type classed as abietic acid. These acids are highly crystalline and resemble abietic acid so closely that no difference therefrom is detectable under the microscope. Their specific rotation is about −50 to −60° in 2% alcohol solution. Such crystalline resin acids have many uses for which rosin is unsuitable because of odor and taste. They can be converted into ester gum or other esters before or after hydrogenation, and are very desirable because of their light color.

By removing abietic acid from wood rosin in accordance with my invention, its tendency to crystallize is removed. Normal wood rosin has a marked tendency to crystallize when held at its melting point for even short periods of time, the abietic acid crystals forming nuclei for other resin acids. These other resin acids, however, do not have as great a tendency as abietic acid to crystallize from the melt in the absence of nuclei. Hence, by removing the abietic acid, a non-crystallizing rosin is obtained. This non-crystallizing rosin is found in the mother liquor from which the sodium acid abietate was originally precipitated. About two-thirds of the usual sample of wood rosin consists of these non-crystallizing acids, and they can be recovered by evaporation of the solvent in which they are dissolved.

The non-crystallizing rosin so produced is slightly higher in unsaponifiable content than the original wood rosin and has a slightly lower melting point. The melting point thereof can be raised as by polymerization with sulfuric acid, removal of resenes, etc. The non-crystallizing rosin is also refinable to lighter grades by treatment with selective adsorbents such as activated carbon, fuller's earth, etc., or by treatment in gasoline solution with furfural or other selective solvent.

The invention is applicable to any rosin containing a substantial abietic acid content and particularly to wood rosin. It is also applicable to gum rosins which have been isomerized so as to contain a substantial proportion of abietic acid.

The drawing gives a flow sheet diagram of the process described in the foregoing. The drawing is believed to be self-explanatory.

The following non-limiting examples are illustrative of the best modes now known to me of carrying out the invention. The parts are by weight.

*Example 1*

Three hundred parts of K wood rosin (M. P. 82–82.5° drop method) was dissolved in 400 parts of ethyl alcohol. 15 parts of a 40% solution of NaOH was added slowly with rapid agitation. Crystals of sodium acid abietate began to form within one-half hour and soon a thick slurry resulted. After four hours' stirring the slurry was filtered. The precipitate was washed twice with alcohol which removed most of the occluded rosin solution. 108 parts of pure white crystals of sodium acid abietate were obtained.

The alcohol mother liquor was admixed with water to precipitate the rosin. Gasoline was added to dissolve the rosin. The gasoline layer was separated and given a countercurrent wash with water, under refluxing conditions, to remove sodium resinate. The gasoline was distilled off to recover the rosin. This rosin (from which the abietic acid had been removed) melted at 79° C., drop method, and had an acid number of 158. It was a non-crystallizing rosin since no crystals formed even when kept for long periods of time at 95° C.

The sodium acid abietate was resolved into abietic acid and sodium acid abietate as follows: To a mixture of 250 parts of benzene and 125 parts of ethyl alcohol was added 100 parts of the sodium acid abietate. Solution was effected by gentle heating. The solution was then shaken with 150 parts of water. The two layers were then allowed to separate and the aqueous alcoholic layer was drawn off. This layer was found to contain 19.4 parts of sodium abietate. The benzene solution of abietic acid was then countercurrently washed with 50% alcohol to remove the last of the sodium abietate. The wash liquid was combined with the aqueous alcoholic layer.

The benzene layer was distilled to recover the abietic acid. The resulting resinous abietic acid had a drop melting point of about 90° C. in the glassy state, an acid number of about 185, and was readily crystallized from alcohol or acetone.

The sodium abietate solution was distilled to remove the alcohol, and the resulting aqueous solution spray dried to yield substantially anhydrous sodium abietate. This sodium abietate powder was recycled through the above procedure, in place of the NaOH originally employed. 37.9 parts by weight of the sodium abietate were required to combine with about 108 g. of abietic acid in the original rosin, since only three molecules of abietic acid will combine with one molecule of sodium abietate whereas four molecules of abietic acid will combine with one molecule of sodium hydroxide.

*Example 2*

Three hundred parts of D gum rosin was dissolved in 400 parts of ethyl alcohol. 5 parts of 37% HCl was added with stirring. The solution was heated at 70° C. for 30 minutes and then the HCl was neutralized by the addition of 5 parts of 40% NaOH. The resulting solution of isomerized gum rosin contained a high percentage of abietic acid. This solution was then treated in exactly the same manner as in Example 1.

*Example 3*

Three hundred parts of French gum rosin was isomerized exactly as in Example 2 and carried through the process of Example 1.

*Example 4*

To 600 parts of 95% ethyl alcohol containing 45 parts of sodium abietate was added 450 parts of K wood rosin with rapid agitation. After 8 hours' stirring the slurry of sodium acid abietate was centrifuged and the crystals were given a displacement wash with 90% alcohol. The filtrate was concentrated by evaporation and washed with dilute acid to yield about 300 parts of non-crystallizing rosin.

The yield of sodium acid abietate was 110 parts by weight. This sodium acid abietate was added to a mixture of 450 parts of 90% ethyl alcohol and 400 parts gasoline. After stirring at 40° C. for about 15 minutes the sodium acid abietate was dispersed. The alcohol layer was separated from the gasoline layer. The gasoline layer was given a countercurrent wash with 90% alcohol. The combined alcohol solutions of sodium abietate was freed of part of its water by azeotropic distillation with 400 parts of benzene, until all of the benzene was removed. The remaining alcohol solution contained about 28 parts of sodium abietate which was recovered by spray-drying and added to a solution of 280 parts of K wood rosin in 95% alcohol to produce more sodium acid abietate.

*Example 5*

To a mixture of 900 parts 95% methanol and 900 parts narrow range gasoline (B. R. 200–270° F.) was added 180 parts sodium acid abietate (3:1 salt) with stirring at 45° C. The mixture was cooled to 30° C. and the two layers were separated. The alcohol layer was washed with fresh gasoline. The gasoline layer was washed with fresh methanol. The wash liquids were washed with each other and separated. The alcohol layer and alcohol washes were combined and cooled to 10° C. which caused separation of a gasoline phase in small amount. This gasoline phase was removed.

To the alcohol layer was added 450 parts of pulverized K wood rosin with stirring. After 6 hours stirring and 16 hours standing without stirring, the sodium acid abietate which had precipitated was removed by centrifuging and dried. The crude crystals amounted to 130 parts. After being twice slurried with acetone and centrifuged dry they amounted to 106 parts by weight.

The narrow range gasoline layer containing the abietic acid was evaporated to yield about 110 parts of abietic acid.

The alcoholic rosin solution (the mother liquor) from which the sodium acid abietate had been removed was evaporated and washed with 2% HCl and then with water to yield about 400 parts of a non-crystallizing rosin.

*Example 6*

The procedure of Example 4 was duplicated exactly except that in place of 90% ethyl alcohol and gasoline for the dissociation of the sodium acid abietate there was employed 80% ethyl alcohol and petroleum ether, respectively. The results were similar.

*Example 7*

To a solution of 300 parts of K wood rosin in 500 parts acetone was added 46 parts sodium abietate. After stirring 4 hours, the precipitated sodium acid abietate was removed by centrifuging. The crystals were washed free of rosin with fresh acetone and dried. The yield was 130 parts of sodium acid abietate.

The mother liquor was concentrated, washed with dilute mineral acid and then with water to obtain 210 parts non-crystallizing rosin.

The sodium acid abietate was added to a mixture of 700 parts of 80% ethyl alcohol and 700 parts of gasoline with stirring. The two layers were separated and each was given a countercurrent wash with the opposite solvent.

The gasoline phase yielded on evaporation about 150 parts abietic acid.

The alcohol phase was concentrated by azeotropic distillation with benzene to remove all solvents leaving a residue of solvent free sodium abietate for recycling in the process.

Instead of the procedure described above, I may carry out the inventive concept by a modified process wherein the mother liquor left upon separation of the sodium acid abietate is concentrated to increase its rosin content to at least about 70%, admixed with an immiscible solvent for the non-crystallizing rosin therein such as gasoline which causes separation of a polar solvent phase, the phases separated, and the residual concentrate phase containing the polar solvent used as the polar solvent in the dissociation of the separated sodium acid abietate.

Thus, the residual concentrate phase may be admixed with an immiscible nonpolar solvent for abietic acid, and with the sodium acid abietate, whereupon there takes place dissociation of the latter into abietic acid which goes into the nonpolar phase and into sodium abietate which goes into the polar phase. The phases are then separated and recovered and used in the manner outlined above. The polar phase containing sodium abietate may be recycled directly and used as a source of polar solvent and sodium abietate in the initial precipitation of sodium acid abietate from rosin. If desired, the polar solvent recovered from the concentration of the mother liquor may be added to the final polar phase containing sodium abietate before re-cycling.

By following the modified procedure described in the preceding paragraph, a simplification of procedure and a reduction in amount of expensive distillation are effected.

Following is a typical example of the procedure just described.

Example 8

To 50 parts of sodium abietate in 200 parts 10% methanol and 1600 parts of recovered 98% methanol was added 450 parts of molten K wood rosin while agitating. After 6 hours agitation, the crystalline magma obtained is centrifuged or filtered to recover 150 parts of crystalline 3:1 salt. The filtrate contains from 14 to 16% of non-crystallizing rosin.

The filtrate is distilled to remove methanol and to raise the rosin concentration in the filtrate to 70-80%. This step yields 1800 parts 98% methanol which is returned to the system, and a residue consisting of 337 parts non-crystallizing rosin, 13 parts sodium resinate and 200 parts 10% methanol.

This concentrate is then admixed with 1800 parts of gasoline which dissolves the rosin and "kicks out" the weak methanol, forming two phases. One of the phases consists of a gasoline solution of non-crystallizing rosin and the other consists of 13 parts sodium resinate in 200 parts 10% methanol.

The gasoline is stripped from the gasoline phase and returned to the system leaving 337 parts of non-crystallizing rosin.

The methanol phase is commingled with 550–600 parts of gasoline and the 150 parts of sodium acid abietate formed above. Two phases form, one consisting of 113 parts abietic acid in the gasoline and the other consisting of 50 parts sodium abietate in 200 parts of 10% methanol. The abietic acid is recovered from the gasoline phase by evaporation. If desired, the gasoline phase may be washed with water prior to evaporation.

The methanol solution of sodium abietate is diluted with the methanol distilled from the first filtrate and the solution recycled for re-use in the formation of more 3:1 salt.

Cooling to as low as 10° C. in the 3:1 salt forming step may be resorted to if desired in order to improve the yield of 3:1 salt. Similar cooling may be resorted to in order to improve the effectiveness of separation of the methanol solution of sodium abietate from the gasoline solution of abietic acid.

From the foregoing it will be seen that the process of the present invention enables the more convenient and economical separation of abietic acid from rosin, and that by the continuous use of sodium abietate as a carrier for abietic acid these results are accomplished, without consumption of substantial amounts of chemicals after operation of the process has been inaugurated. Numerous other advantages of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. The process of recovering abietic acid from rosin which comprises commingling an alkali metal abietate with rosin to form an acid abietate, contacting the acid abietate with two solvents capable of immiscibility with each other, the first solvent being a solvent for alkali metal abietate and comprising at least a small amount of water, the second solvent being a solvent for abietic acid, forming as two phases a solution of alkali abietate in said first solvent and a solution of abietic acid in said second solvent, separating the resulting phases, and recycling the alkali abietate contained in its respective solution phase for use in said commingling step.

2. The process of recovering abietic acid from rosin which comprises commingling sodium abietate with rosin to form an acid abietate, contacting the acid abietate with two solvents capable of immiscibility with each other, the first solvent being a solvent for sodium abietate and comprising at least a small amount of water, the second solvent being a solvent for abietic acid, to dissociate said acid abietate and form a solution of abietic acid in said second solvent and a solution of sodium abietate in said first solvent, and separating the resulting phases.

3. The process of recovering abietic acid from an alkali acid abietate which comprises commingling said alkali acid abietate with two solvents capable of immiscibility with each other, the first solvent being a solvent for alkali metal abietate, the second solvent being a solvent for abietic acid, to cause said alkali acid abietate to dissociate and form a solution of abietic acid in said second solvent and a solution of alkali abietate in said first solvent, and separating the resulting phases.

4. The process of recovering abietic acid from rosin which comprises combining sodium abietate and rosin to form sodium acid abietate, separating the sodium acid abietate so produced, dissociating said sodium acid abietate into substantially pure abietic acid and sodium abietate, and recycling said sodium abietate in a repetition of the process.

5. The process of recovering essentially pure abietic acid from rosin which comprises commingling rosin a lower aliphatic alcohol, and sodium abietate thereby forming an insoluble precipitate of sodium acid abietate, separating said sodium acid abietate, commingling said sodium acid abietate with aqueous lower aliphatic alcohol and a hydrocarbon solvent in immiscible proportions, separating the resulting phases, recovering abietic acid from the hydrocarbon phase, and recycling the sodium abietate contained in the aqueous alcohol phase for use in said first-named commingling step.

6. The process of recovering abietic acid from rosin which comprises commingling rosin, sodium abietate and a solvent therefor, separating the resulting precipitated sodium acid abietate from the mother liquor, concentrating the mother liquor, admixing the concentrate with a solvent immiscible therewith but a solvent for the rosin therein, separating the resulting immiscible solvent phase containing the rosin, admixing the residual concentrate phase with a solvent immiscible therewith but a solvent for abietic acid and with said precipitated sodium acid abietate, and separating the resulting phase containing dissolved sodium abietate from the resulting phase containing dissolved abietic acid.

7. The process of recovering abietic acid from rosin which comprises commingling rosin, sodium abietate and aqueous methyl alcohol, separating the resulting precipitated sodium acid abietate, evaporating the mother liquor to increase the rosin concentration to at least about 70%, admixing the resulting evaporated mother liquor with gasoline to dissolve the rosin and form a separate methyl alcohol phase, separating the resulting gasoline phase from the methyl alcohol phase, commingling the methyl alcohol phase with said sodium acid abietate and with gasoline to cause said sodium acid abietate to dissociate into abietic acid which dissolves in said gasoline and into sodium abietate which dissolves in said methyl alcohol phase, separating the resulting phases, recovering abietic acid from the gasoline phase, and recycling the methyl alcohol phase containing sodium abietate for use in said first-mentioned commingling step.

8. The process of recovering abietic acid from rosin which comprises commingling rosin with sodium abietate in the presence of a gasoline-immiscible solvent for the rosin and the sodium abietate but nonsolvent for sodium acid abietate, separating the resulting precipitated sodium acid abietate, evaporating the mother liquor to increase the rosin concentration to at least about 70% and recovering the volatilized portion, admixing the evaporated mother liquor with gasoline in amount sufficient to cause the rosin therein to dissolve in the gasoline, separating the resulting gasoline phase from the phase comprising said gasoline immiscible-solvent, commingling said phase comprising said gasoline-immiscible solvent with said sodium acid abietate and with gasoline to cause said sodium acid abietate to dissociate into abietic acid which dissolves in said gasoline and into sodium abietate which dissolves in said phase comprising said solvent, separating the resulting phases, recovering abietic acid from the resulting gasoline phase by evaporation of the gasoline, adding the volatilized portion recovered from the evaporation of said mother liquor to the resulting sodium abietate phase, and recycling the resulting sodium abietate solution.

9. The process for forming an acid abietate of an alkali metal which comprises treating rosin with a neutral alkali metal abietate in a reaction medium which is a solvent for rosin but nonsolvent for the acid abietate, and recovering the resulting precipitated acid abietate from the reaction mixture.

10. A process for forming sodium acid abietate which comprises treating rosin with neutral sodium abietate in a reaction medium comprising essentially alcohol, and recovering the resulting precipitated sodium acid abietate from the reaction mixture

RICHARD F. B. COX.